(12) United States Patent
Kong

(10) Patent No.: US 9,946,077 B2
(45) Date of Patent: Apr. 17, 2018

(54) COLLAPSIBLE VIRTUAL REALITY HEADSET FOR USE WITH A SMART DEVICE

(71) Applicant: Ginger W Kong, South San Francisco, CA (US)

(72) Inventor: Ginger W Kong, South San Francisco, CA (US)

(*) Notice: Subject to any disclaimer, the term of this patent is extended or adjusted under 35 U.S.C. 154(b) by 65 days.

(21) Appl. No.: 14/994,838

(22) Filed: Jan. 13, 2016

(65) Prior Publication Data

US 2017/0199385 A1  Jul. 13, 2017

Related U.S. Application Data

(60) Provisional application No. 62/103,096, filed on Jan. 14, 2015.

(51) Int. Cl.
*G02B 27/14* (2006.01)
*G02B 27/01* (2006.01)
*H04N 13/04* (2006.01)

(52) U.S. Cl.
CPC ..... *G02B 27/0176* (2013.01); *G02B 27/0172* (2013.01); *G02B 27/0179* (2013.01); *H04N 13/044* (2013.01); *G02B 2027/0181* (2013.01); *H04N 2213/001* (2013.01)

(58) Field of Classification Search
CPC .............. G02B 27/017; G02B 27/0172; G02B 27/0179; G02B 2027/0134; G06T 15/205
USPC .......... 359/13, 14, 466, 467, 474–477, 643; 348/53, 115, 121, 739; 345/9, 905
See application file for complete search history.

(56) References Cited

U.S. PATENT DOCUMENTS

| | | | | |
|---|---|---|---|---|
| 6,069,735 | A  * | 5/2000 | Murphy | G02B 27/2257 359/408 |
| 6,888,940 | B1 * | 5/2005 | Deppen | B60R 11/0241 379/446 |
| 2010/0133888 | A1 * | 6/2010 | Montuore | B60N 2/2851 297/397 |
| 2014/0160760 | A1 * | 6/2014 | Pohlert | G03B 15/02 362/277 |
| 2015/0234189 | A1 * | 8/2015 | Lyons | G02B 27/0172 345/174 |
| 2015/0358539 | A1 * | 12/2015 | Catt | G06T 7/593 348/38 |

(Continued)

*Primary Examiner* — Stephone B Allen
*Assistant Examiner* — Travis Fissel
(74) *Attorney, Agent, or Firm* — Michael L. Greenberg, Esq.; Greenberg & Lieberman, LLC

(57) ABSTRACT

The present invention relates to a new type of collapsible virtual reality headset to view a three-dimensional environment on a smart device that can be folded into a self-contained package for compact storage and ease of portability. Through its design of structural folds, the collapsible virtual reality headset offers portability, durability, and adaptability to be mounted to headphone, headgear, and/or to be used with a haptic device. Users of the invention download software applications onto their smart devices and use this display apparatus to view the virtual stereoscopic images or video through left and right lens systems. Users of this invention can adjust the pupillary distance and the distance between the lenses from the smart device display for optimal user comfort. The invention is made up of material that makes it water resistant and may be stored in one's bag or pocket when configured in its compact form.

9 Claims, 13 Drawing Sheets

(56) References Cited

U.S. PATENT DOCUMENTS

2016/0127716 A1* 5/2016 Ramiro ................ H04N 13/044
                                                                  348/53
2016/0232713 A1* 8/2016 Lee ....................... G06T 19/006

* cited by examiner

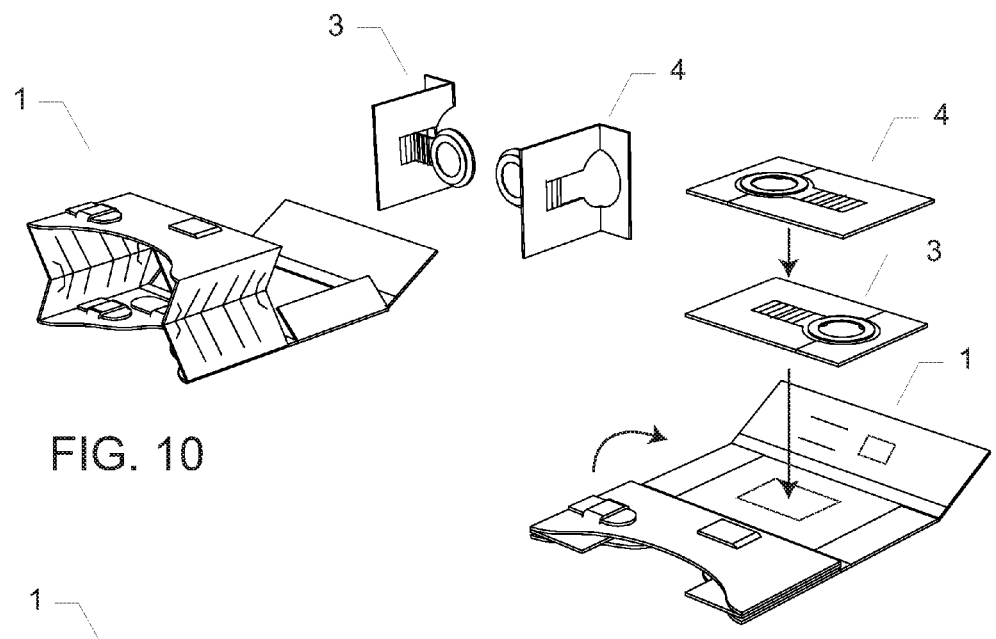
FIG. 10
FIG. 11
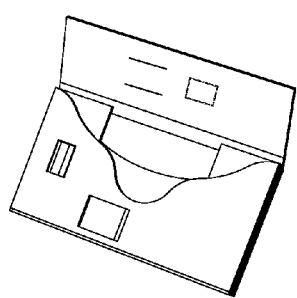
FIG. 12
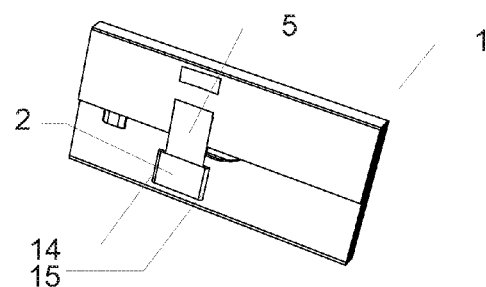
FIG. 13

COLLAPSIBLE VIRTUAL REALITY HEADSET FOR USE WITH A SMART DEVICE

CONTINUITY

This application is a non-provisional application of provisional patent application No. 62/103,096, filed on Jan. 14, 2015, and priority is claimed thereto.

FIELD OF THE PRESENT INVENTION

The present invention relates generally to devices configured to display simulated environments, and more specifically relates to a portable and foldable apparatus to view a three-dimensional computer-simulated environment or 360° contents (video and images) on a smart device.

BACKGROUND OF THE PRESENT INVENTION

The traditional foldable viewers were box-type viewers that included a pair of optical lenses locked in one position to view stereoscopic images appearing slides, film, and or transparencies. Users hold the viewer up to a light source so that the translucent image can shine through and produce a three-dimensional image. The three-dimensional images are limited by the perspective taken in the transparencies. The foldable viewers designed to view three-dimensional images from photographic images, not on smart devices.

The conventional box-type viewers were constructed from single cardboard or paper stock with flaps and tabs to fold and form the box-type viewers. Exemplary of these stereographic viewer are disclosed in U.S. Pat. Nos. 4,175,828, 4,242,818, 5,557,457, 5,894,365, 6,028,700, 4,973,087, and 6,069,735. Such designs amount to a relatively non-adjustable mask with lenses, often without free-moving lenses. This limits the adjustability for different faces sizes and differences in pupil distance.

The virtual reality display systems evolve into an electronic deployed head or helmet mounted display that placed a viewing screen in front of the user's eyes and recorded the movement of the user's head to move determine what should be shown on the display. When the head turned to one side, the display was refreshed to show what was in the virtual world in the direction they turned their head. In these systems, the optical lenses are in fixed positions. While image quality of the virtual reality visualization systems have improved, known systems of this prior art have certain drawbacks to the bulkiness of the housing in these virtual reality display systems. Exemplary of virtual reality headset is disclosed in U.S. Pat. No. D701,206.

Virtual reality systems are used for entertainment, gaming, art, education, medicine, virtual tours, sport, and training for military, fire, and police. In recent years, virtual reality systems can be viewed on smart devices by downloading software application with virtual reality environment display. These virtual reality systems use smart device technology to run as the display screen and VR engine. Prior art devices for use with smart devices, similar to Google Cardboard™, constructed of cardboard or cardstock, are not water resistant and don't have adjustable pupillary distance. This type of cardboard viewer is usually handheld and not designed for use with straps. Other prior art devices for use with smart devices made of aluminum or molded plastic are bulky and heavy to be carried in a personal object holder such as a bag or pocket.

While the viewers of prior art for smart devices makes the virtual reality systems accessible to a larger audience, they are not crafted for everyday use.

Other prior art devices are the stand-alone unit, similar to Oculus VR, Inc™, that has built-in gyroscope and accelerometer but requires running on a computer and not mobile applications on a smart device.

Thus, there is a need for a system for an apparatus that facilitates a VR experience that is crafted for everyday use, is configured to be used with mobile applications on a smart device rather than a conventional computer, and is lightweight, adjustable, foldable, and portable.

SUMMARY OF THE PRESENT INVENTION

The invention is a sturdy, reusable, and collapsible virtual reality headset to view two-dimensional offset images as a single three-dimensional display, giving the illusion of depth perception, from a smart device. The optical system of the invention provides means for adjusting the distance between lenses and distance between lenses from the smart devise display relative to the user's eyes.

The pupillary distance varies between 53-76 mm for adults and 41-55 mm for children, For display apparatus where the distance between lenses are not adjustable and the positions do not coincide with the user's pupillary distance, this can cause fatigue, amblyopia, headaches, and discomfort to the user.

In a first embodiment, the invention provides a foldable design for a virtual reality headset for use with a smart device. The frame design of structural folds allows the headset configured into a compact and self-contained case for easy storage and transport. The optical system includes a pair of biconvex lenses (25 mm-45 mm) that can be disassembled to fit in the self-contained case.

The present invention provides novel features to enhance the comfort and portability on the virtual reality headset, for everyday use. For durability, the collapsible view will be made of water-resistant materials. The design of the structural folds in the present invention is crafted for adaptable use to straps the viewer as a headset, or coupled with headphones or haptic devices to control the software application. This suspension mechanism helps offset the weight of the viewer and the smart device, making the invention comfortable for longer use period. A silicone, HE foam, or EPDM rubber material is placed around the contour lip of the edges that contact the users' face for comfort and add rigidity to the main body. The present invention provides the viewer with enhanced images with adjustable pupillary distance, not predefined distance between the optical lenses and the smart device. Furthermore, the users can be reassured that the smart device is stable in position and will not fall off the viewer housing with the use of innovative suction technology.

BRIEF DESCRIPTION OF THE DRAWINGS

The present invention will be better understood with reference to the appended drawing sheets, wherein:

FIGS. 10-13 show a sequence of perspective views depicting the folding of the virtual reality headset into a compact case configuration for transport and storage.

Figure 1:
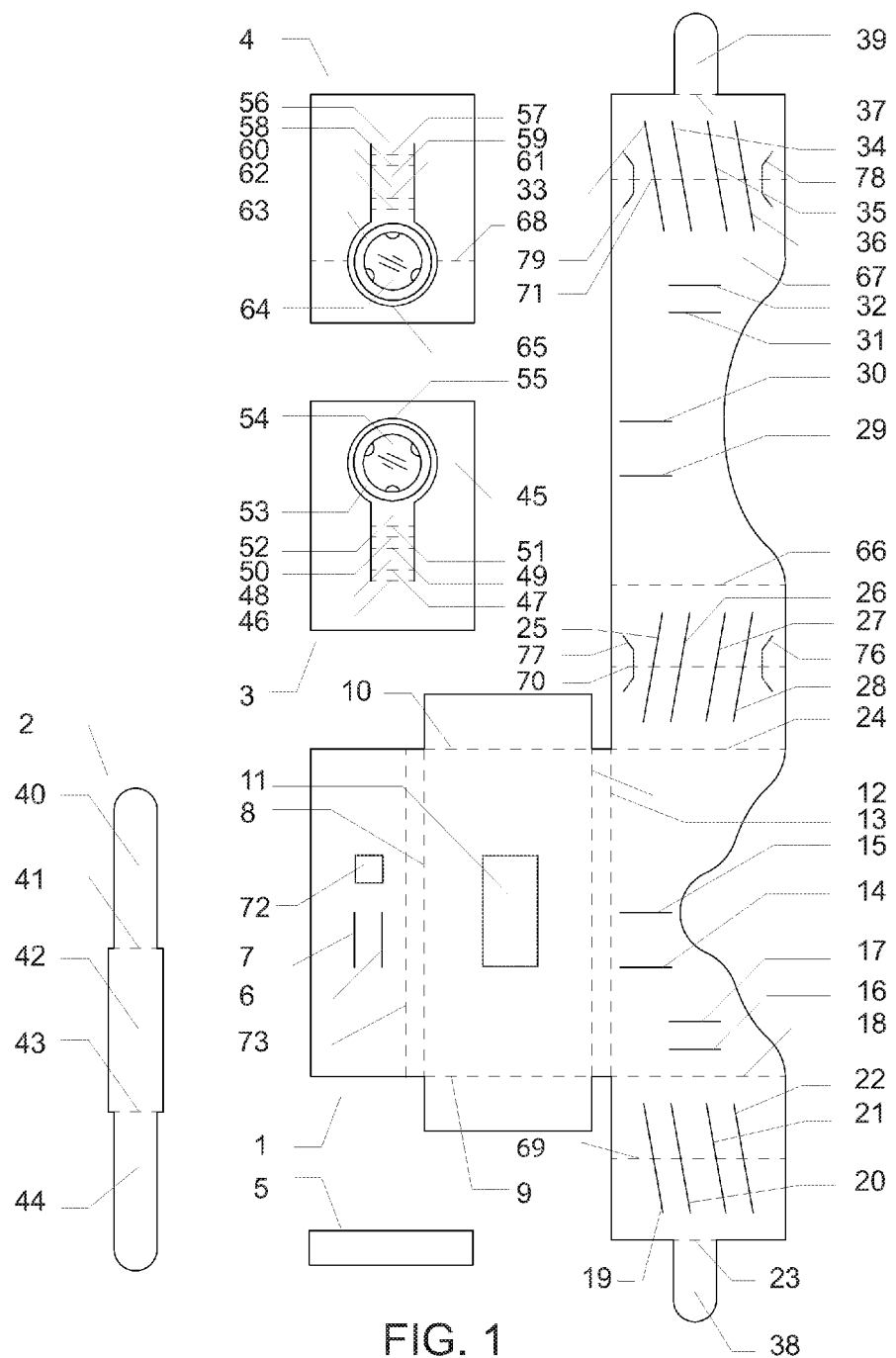
FIG. 1 is the top plan view of a blank from which the optical viewer of the present invention is assembled.

The broken lines shown in the drawings represent portions of the virtual reality headset that form no part of the claimed design.

DETAILED DESCRIPTION OF THE PREFERRED EMBODIMENT

The present invention generally comprises a virtual reality headset construction designed to create a lightweight, portable, foldable, stereoscopic viewer. An embodiment of the virtual reality headset is formed of a single panel of high strength, bendable, foldable plastic material. The panel is shaped and creased so that it may be folded and assembled into the virtual reality viewer to view three-dimensional environment, and may be refolded and reassembled to form an integral self-contained carrying case for storage and transport.

A collapsible virtual reality viewer of the present invention is illustrated in FIG. 1 and is comprised of viewer housing 1, image separator 2, associated lens holders 3 and 4, and a locking strip 5. The preferred material for the folded shell is a polystyrene panel with predetermined creases; design is essential for the purposes of the invention. The panel can also be constructed from a durable, semi-rigid material like polypropylene, polyethylene, cardboard, nylon, or aluminum, which may be matte, textured, or smooth finish.

Figure 2:
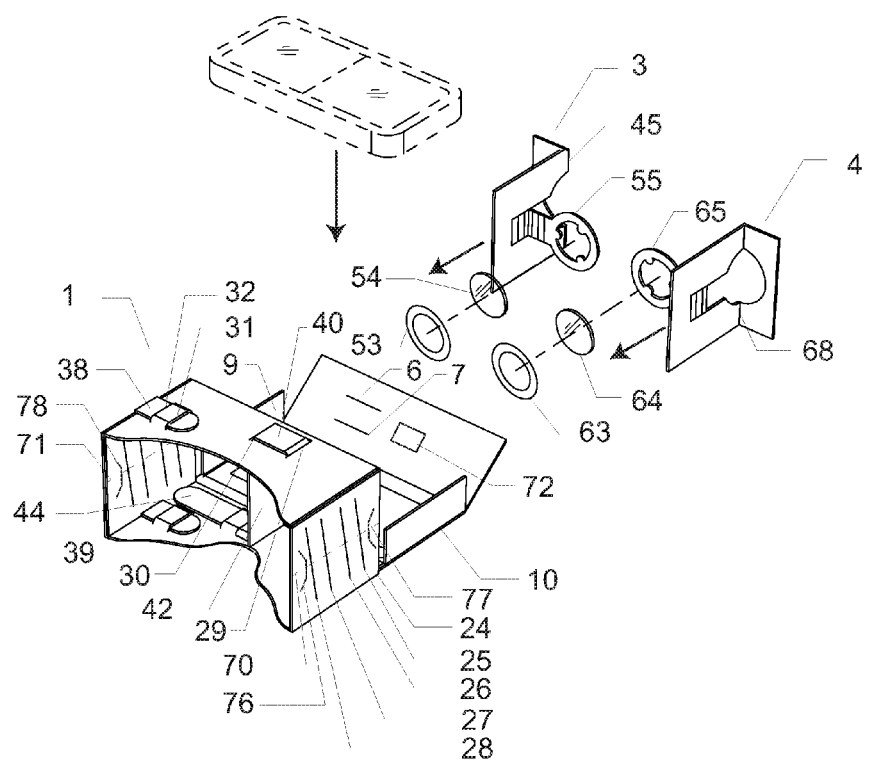
FIG. 2 is the exploded perspective view of the virtual reality headset of the present invention, shown in the fully assembled condition.
Figure 3:
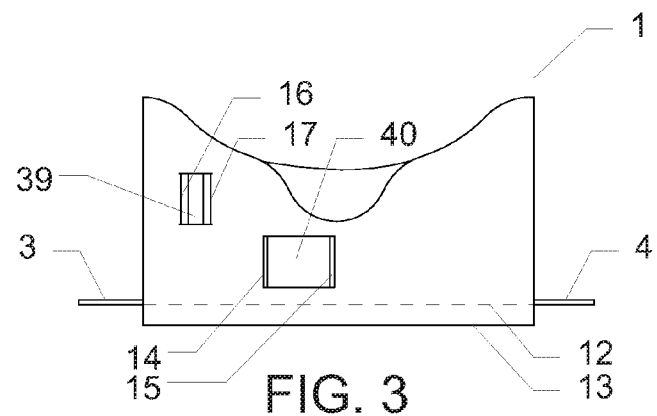
FIG. 3 is the bottom elevation view of the virtual reality headset as shown in fully assembled condition.
Figure 4:
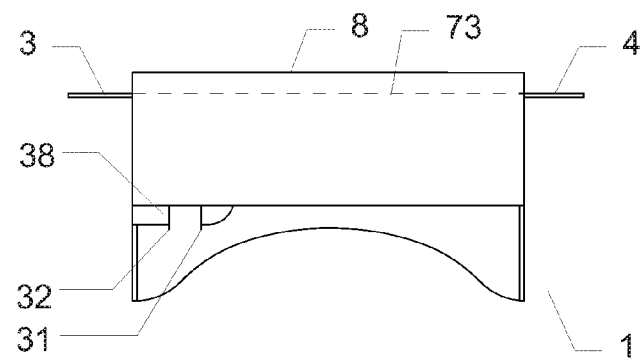
FIG. 4 is the top plan view of virtual reality headset as shown in the fully assembled condition.

As shown in FIG. 2, the viewer housing 1 has a front wall, top wall, left wall, right wall, and bottom wall, bounded by folds lines 8, 9, 10, 13, 18, 23, 24, 37, 66, and 67. The right wall is held in place by side wall flap assembly 38 through slit openings 31 and 32 and side wall flap assembly 39 through slit openings 16 and 17. The viewer housing 1 is stabilized with the attachment of the image separator 2. The image separator 2 is configured by fold lines 41 and 43. Flaps 40 and 44 are attached through the slit openings 14, 15, 29, and 30 respectively to keep the image separator 2 in place. Image separator 2 can be constructed of fabric, string, and/or a rubber band.

Figure 5:
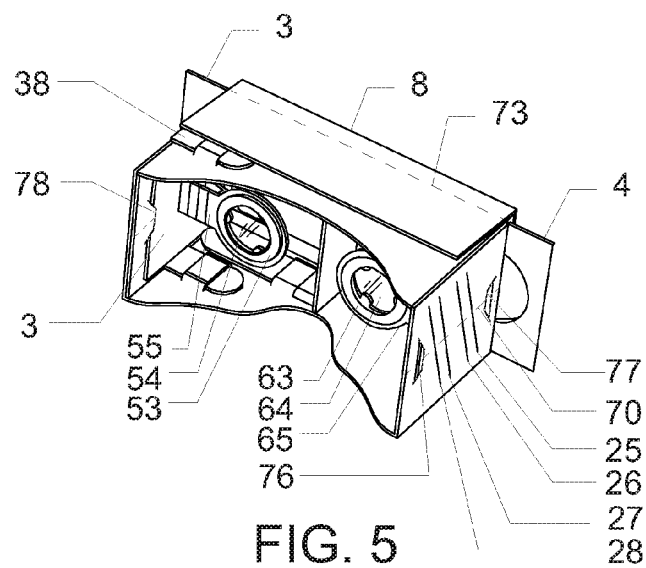
FIG. 5 is bottom, rear, left perspective view of virtual reality headset of the present invention, shown in the fully assembled condition.
Figure 6:
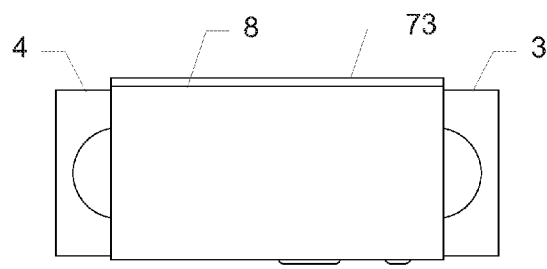
FIG. 6 is the front elevation view of virtual reality headset of the present invention as shown in the fully assembled condition.
Figure 7:
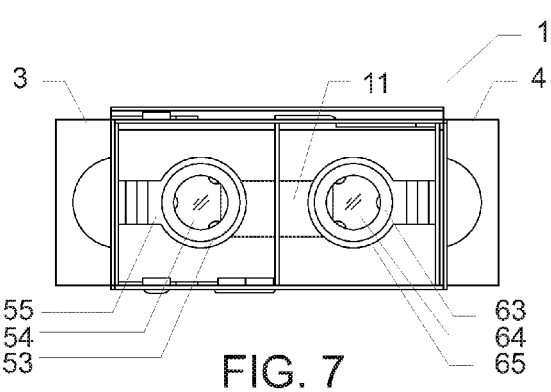
FIG. 7 is the rear elevation view of virtual reality headset of the present invention as shown in the fully assembled condition.
Figure 8:
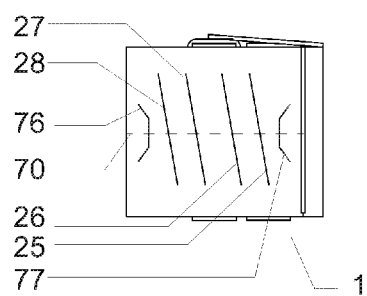
FIG. 8 is the right side view of virtual reality headset as shown in the fully assembled condition.
Figure 9:
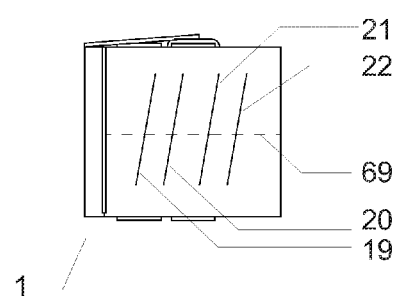
FIG. 9 is the left side view of virtual reality headset as shown in the fully assembled condition.

The lens holders 3 and 4 compromise of a pair of biconvex lenses 54 and 64, attached to panels 55 and 65 respectively by adhesives 53 and 63. The lens holders 3 and 4 are inserted next to the left and right walls between flaps 76-79 as shown in FIG. 1 and FIG. 5. The fold lines 46, 47, 48, 49, 50, 51, 52, 53, 56, 57, 58, 59, 60, 61, and 62 allow the pupillary distance to be adjusted. The lens holders 3 and 4, in an alternative embodiment, could be a single lens assembly with two lenses held in fixed positions; and in another embodiment, could be a single lens assembly with two lenses being adjustable.

After the smart device is placed on top of the micro suction pad 11, the front wall of the housing is folded along fold line 13 and secured by the micro suction pad 72 in the fully assembled condition as shown in FIGS. 3, 4, 6, 7, 8, and 9. The single panel can also be secured by other methods of attachment but not limited to Velcro™ strips.

FIGS. 10, 11, 12, and 13 sequentially illustrate the assembly of the invention to a self-contained case. The viewer housing is configured into collapsible form, by the fold lines 69, 70, and 71. The locking strip 5 is inserted under flap 44 and slit openings 6 and 7 to keep the compact assembly intact.

Figure 14:
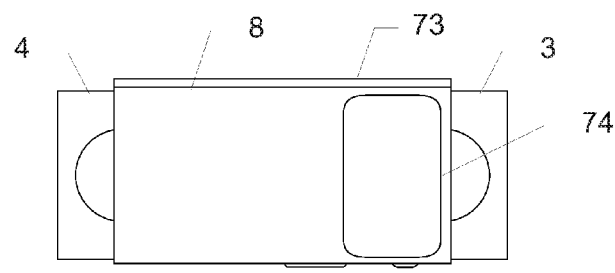
FIG. 14 is the front elevation view of a second preferred embodiment as shown in the fully assembled condition.

The second preferred embodiment of the present invention features a collapsible viewer with an opening for camera lens in the front wall as shown in FIG. 14. The feature with camera cutout allows viewer to tailor to software application that may require use of the camera functionality of smart device. The assembly of the invention remains the same as the first preferred embodiment and is comprised of a viewer housing 1, image separator 2, associated lens holders 3 and 4, and a locking strip 5.

Figure 15A:
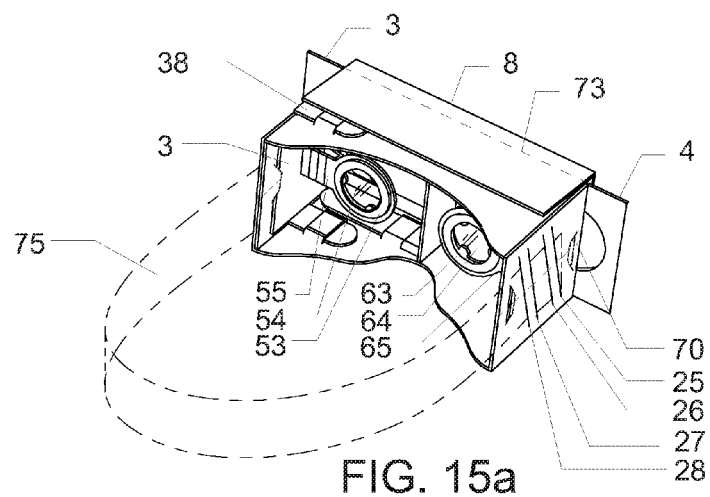
FIGS. 15a and 15b is the bottom, rear, left perspective view of virtual reality headset of a third preferred embodiment as shown in the fully assembled condition.
Figure 15B:
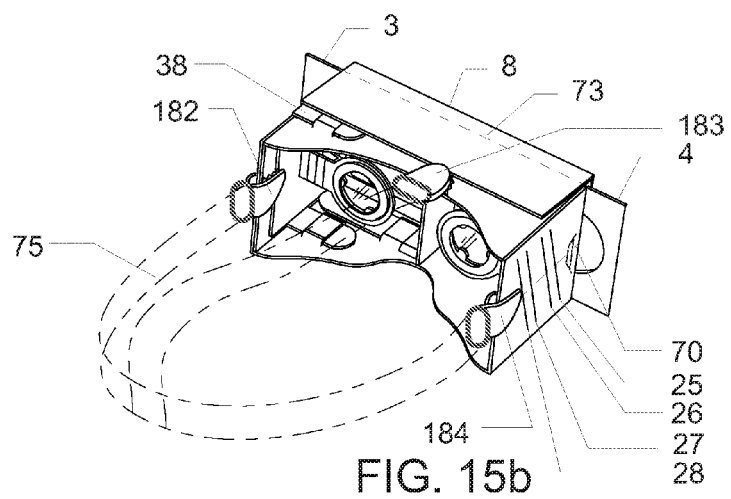

The third preferred embodiment of the present invention features a collapsible viewer with head strap as shown in FIGS. 15a and 15b. FIG. 15a shows the feature head strap attached to the invention through slit openings 19, 20, 21, 22, 33, 34, 35, and 36, FIG. 15b shows other methods of head strap attachment but not limited to alligator clips, hooks, 3M™ Dual Lock™ reclosable fasteners, Velcro™, magnets, or sewn-in. The assembly of the invention remain the same as the first preferred embodiment and is comprised of a viewer housing 1, image separator 2, associated lens holders 3 and 4, and a locking strip 5, A fourth preferred embodiment features an alternative collapsible viewer and comprised of viewer housing 80, image separator 85, associated lens holders and support 81, 82, 83 and 84, and a locking strip 86.

Figure 17:
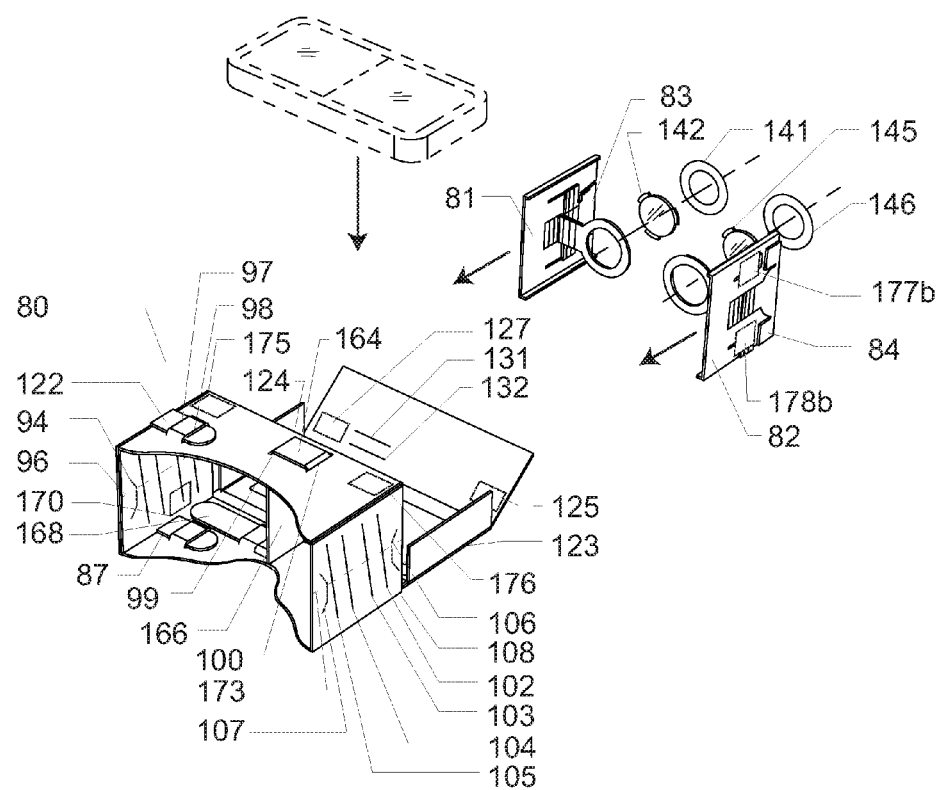
FIG. 17 is the exploded perspective view of the fourth preferred embodiment as shown in the fully assembled condition.
Figure 18:
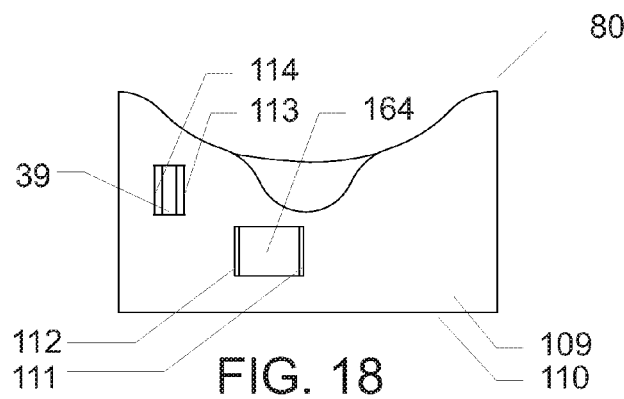
FIG. 18 is the bottom elevation view of the fourth preferred embodiment as shown in the fully assembled condition.
Figure 19:
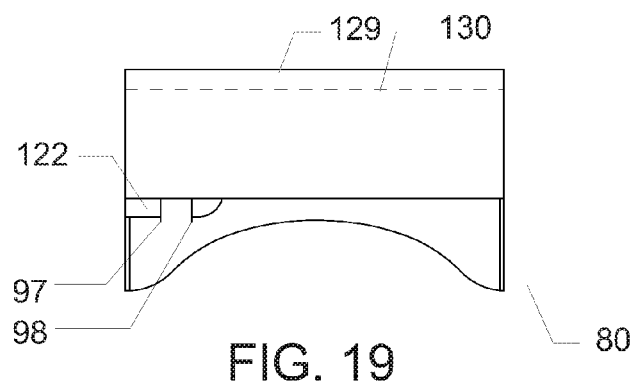
FIG. 19 is the top plan view of the fourth preferred embodiment as shown in the fully assembled condition.

As shown in FIG. 17, the viewer housing 80 has a front wall, top wall, left wall, right wall, and bottom wall, bounded by folds lines 129, 124, 123, 110, 115, 121, 108, 88, 101, and 96. The right wall is hold in place by side wail flap assembly 122 through slit openings 97 and 98 and side wall flap assembly 87 through slit openings 113 and 114. The viewer housing 80 is stabilized with the attachment of the image separator 85. The image separator 85 is configured by fold lines 165 and 167. Flaps 164 and 168 are attached through the slit openings 112, 111, 100, and 99 respectively to keep the image separator 85 in place.

Figure 16:
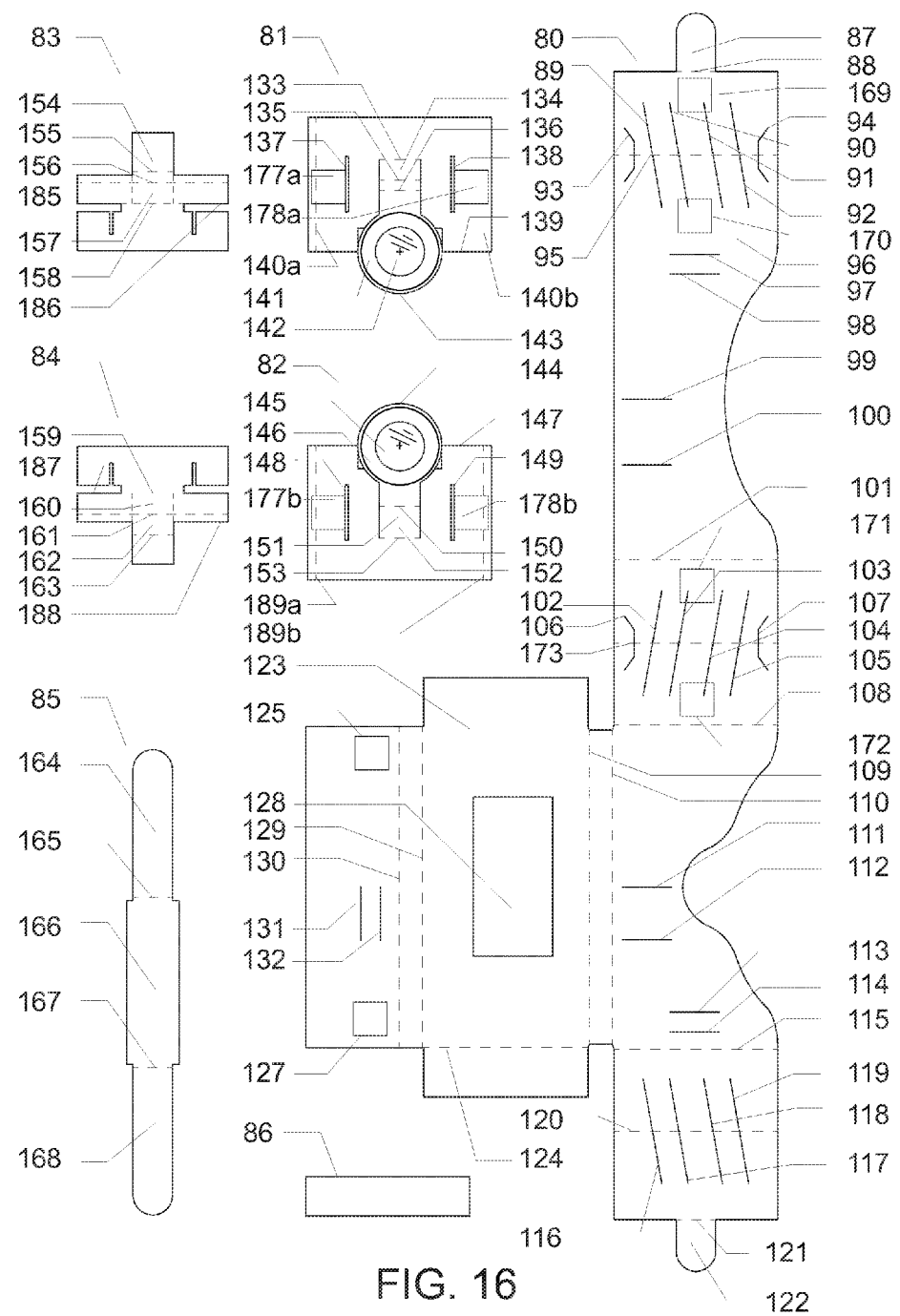
FIG. 16 is the top plan view of a fourth preferred embodiment as shown in the fully assembled condition.
Figure 20:
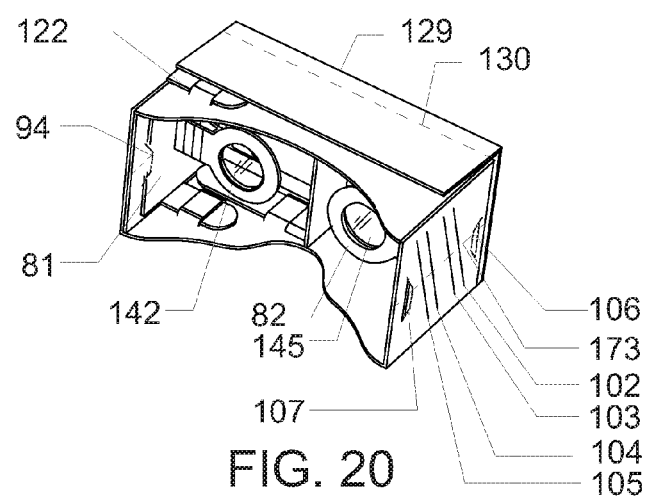
FIG. 20 is bottom, rear, left perspective view of the fourth preferred embodiment, shown in the fully assembled condition.
Figure 21:
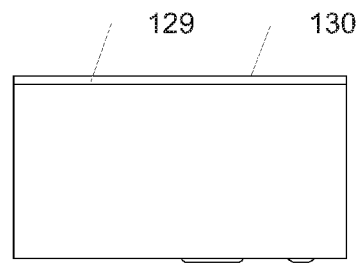
FIG. 21 is the front elevation view of the fourth preferred embodiment as shown in the fully assembled condition.
Figure 22:
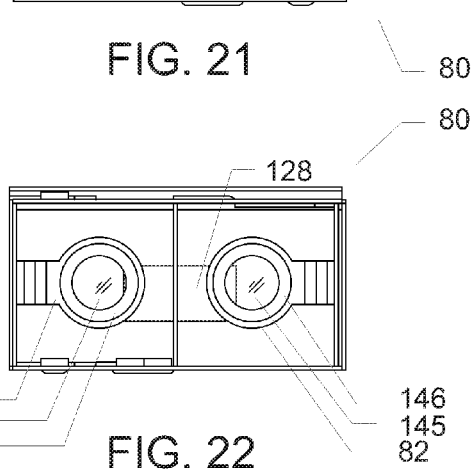
FIG. 22 is the rear elevation view of the fourth preferred embodiment as shown in the fully assembled condition.
Figure 23:
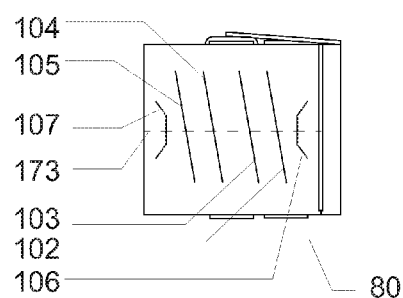
FIG. 23 is the right side view of the fourth preferred embodiment as shown in the fully assembled condition.
Figure 24:
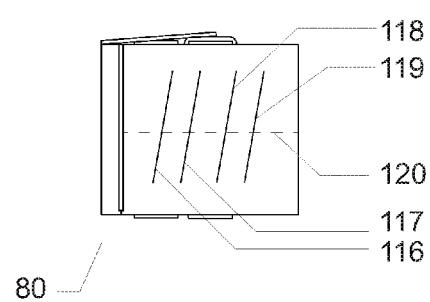
FIG. 24 depicts the left side view of the fourth preferred embodiment as shown in the fully assembled condition.

The lens holders 81 and 82 retain in an upright position with supports 83 and 84 respectively. Supports are inserted into slip openings 137, 138, 148, and 149 and rest securely as shown in FIG. 17. The lens holder assembly comprise of a pair of biconvex lenses 142 and 145, attached to panels 143 and 144 respectively by adhesives 141 and 146. The lens holders assembly 81 and 82 are inserted next to the left and right walls between flaps 93-94 and 106-107 as shown in FIG. 16 and FIG. 20. The fold lines 150-153, 133-136, and 154-163 to allow the pupillary distance to be adjusted.

After the smart device is placed on top of the micro suction pad 128, the front wall of the housing is folded along fold line 110 and secured by Velcro™ strips 125 and 127 in the fully assembled condition as shown in FIGS. 18, 19, 21, 22, 23, and 24.

Figure 25:
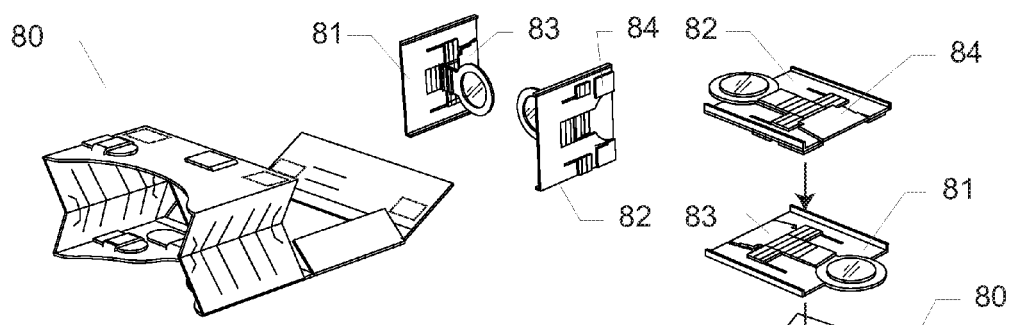
FIGS. 25-28b display a sequence of perspective views depicting the folding of the fourth preferred embodiment into a compact case configuration for transport and storage.
Figure 26:
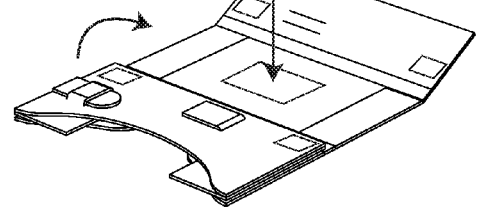
Figure 27A:
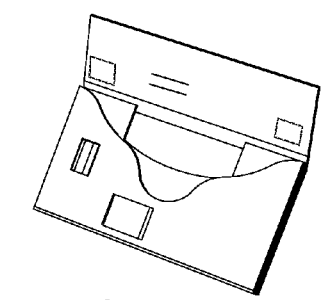
Figure 28A:
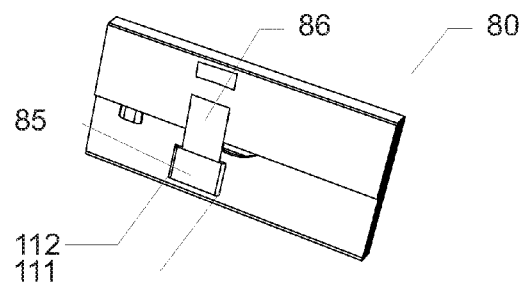
Figure 27B:
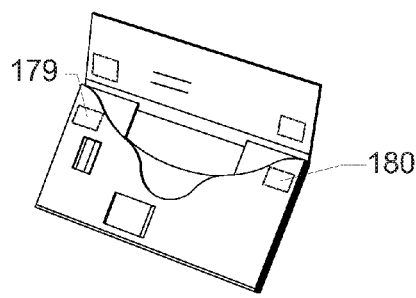
Figure 28B:
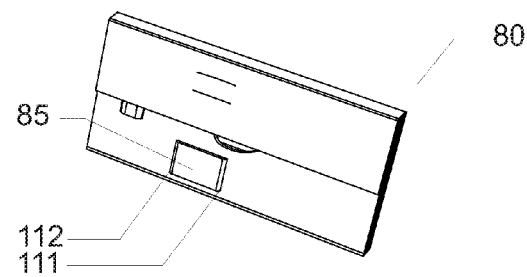

FIGS. 25, 26, 27a, and 28a sequentially illustrate the assembly of the invention to a self-contained case. The viewer housing is configured into collapsible form by the fold lines 120, 173, and 95. The locking strip 86 is inserted under flap 168 and slit openings 131 and 132 to keep the compact assembly intact. An alternative method of keeping compact intact is using Velcro™ strips 179 and 180 as shown in FIGS. 27b and 28b.

Figure 29:
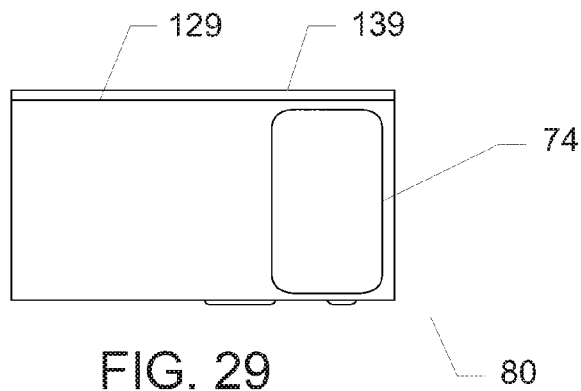
FIG. 29 is the front elevation view of the fourth preferred embodiment as shown in the fully assembled condition.

A fifth preferred embodiment of the present invention features a collapsible viewer with an opening for camera lens in the front wall as shown in FIG. 29. The feature with camera cutout allows viewer to tailor to software application that may require use of the camera functionality of smart device. The camera cutout can be attached to the front face by Velcro™ as a removable panel. Graphics can be printed on any panel of the vie housing. The assembly of the invention remain the same as the fourth preferred embodiment and is comprised of a viewer housing 80, image separator 85, associated lens holders assembly 81-84, and a locking strip 86.

Figure 30A:
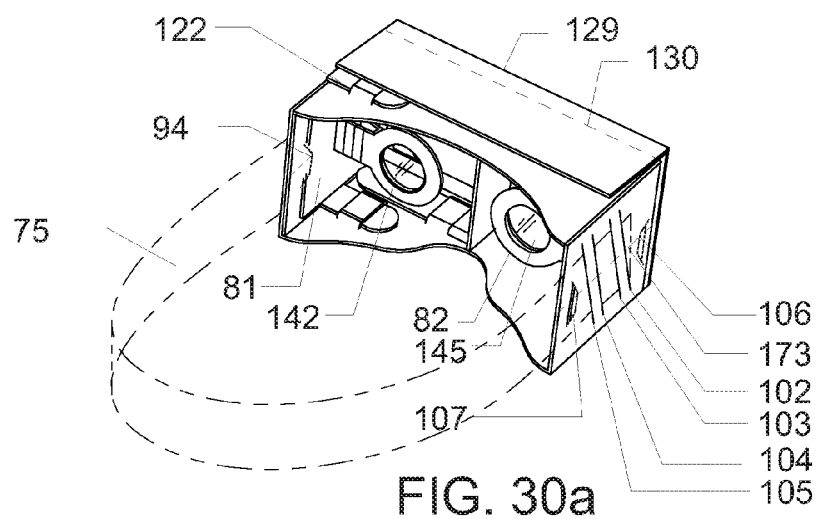
FIGS. 30a and 30b exhibit the bottom, rear, left perspective view of the present invention of the fourth preferred embodiment as shown in the fully assembled condition.
Figure 30B:
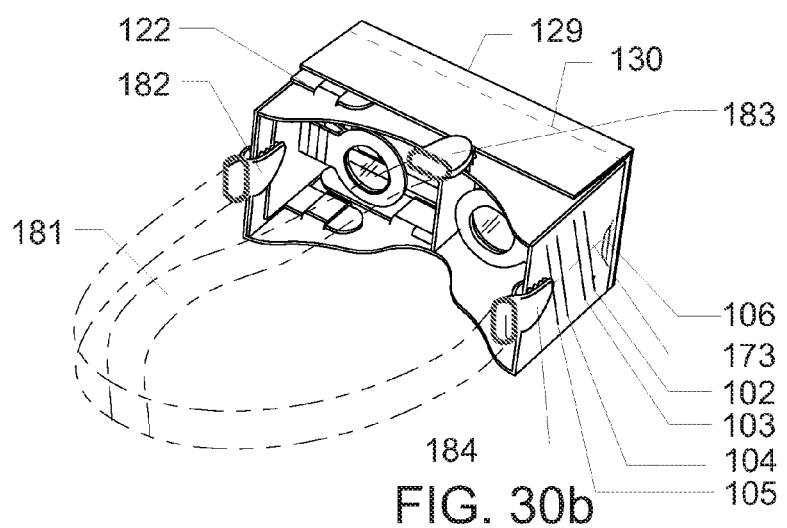

A sixth preferred embodiment of the present invention features a collapsible viewer with head strap as shown in FIGS. 30a and 30b. FIG. 30a shows the feature head strap attached to the invention through slit openings 116-119 and 89-92. FIG. 30b shows other methods of head strap attachment but not limited to alligator clips, hooks, 3M™ Dual Lock™ reclosable fasteners, Velcro™, magnets, or sewn-in. The assembly of the invention remain the same as the fourth preferred embodiment and is comprised of a viewer housing 80, image separator 85, associated lens holders and support 81-84, and a locking strip 86.

Figure 31:
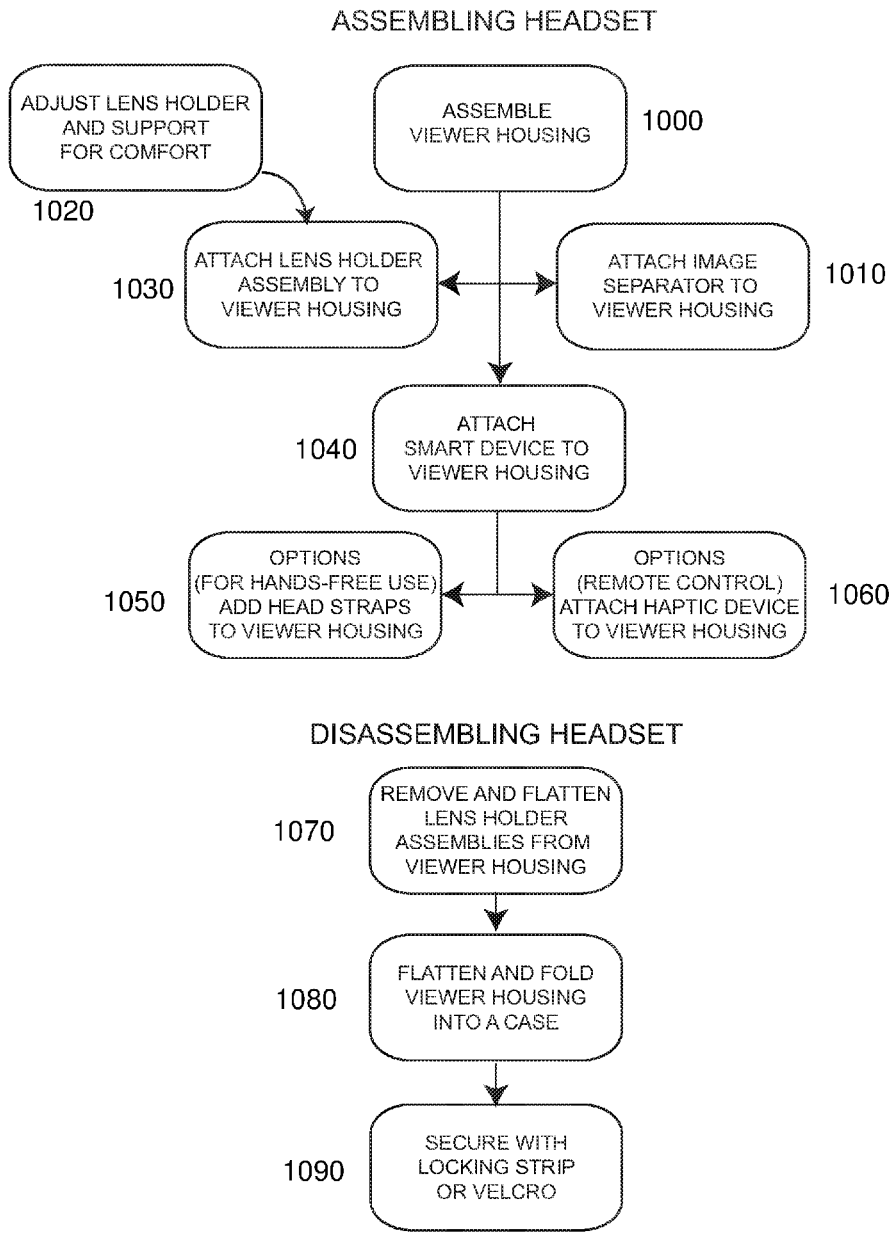
FIG. 31 is a flow chart detailing the process of construction and use of the present invention.

The process of construction and use of the present invention as depicted in FIG. 1, is preferably as follows (a flow chart repesenting the steps is shown as FIG. 31):

1. A collapsible virtual reality viewer of the present invention is illustrated in FIG. 1 and is comprised of viewer housing 1, image separator 2, associated lens holders 3 and 4, and a locking strip 5.
2. To assemble the viewer housing 1, creases 18, 24, 66, and 67 are folded inwardly toward each other into a box, and are secured by sliding flap 39 through slit openings 16 and 17 and flap 38 into openings 31 and 32 as shown in FIG. 2. (1000)
3. Crease 41 of the image separator 2 is folded upward, while crease 43 is folded in the opposite direction. Image separator 2 is attached to the viewer housing by sliding flap 40 through slit openings 29 and 30 and flap 44 into openings 14 and 15. (1010)
4. The lens holder assemblies 3 and 4, are pre-equipped with of a pair of biconvex lenses 54 and 64.
5. Crease 56 of the lens holder 4 is folded at a 90 degree angle with the flat side of lens 64 facing away from crease 68. To retain lens holder assembly 4 at an upright position, crease 68 is folded at a 90 degree in opposite direction as the fold line 68, providing additional structural reinforcement. The bended tab allows wearer to adjust the distance between the lenses to the smart device screen. To tailor to the user's pupillary distance and comfort, use creases 57-62 instead of fold line 56 on the lens holder 4. The same construction method applies to lens holder assembly 3. (1020)
6. The lens holder assemblies 3 and 4 are secured in position between side wall flaps 78-79 and 76-77. The flat side of lens should be facing the wearer. (1030)
7. Set the VR app on the smart device to play before placing the smart device on top of the micro suction pad 11 as shown in FIG. 1.
8. Creases 8, 9, 10, and 13 are folded upward and secured via micro section pad 11 as shown in FIG. 2. The side panels along fold lines 9 and 10 block off light from the sides to reduce glare. (1040)
9. The wearer holds the headsets and looks through the lenses to view the stereoscopic images or video on smart device screen.
10. To assemble the headset for hands-free use as shown in FIGS. 15a and 15b, head straps are inserted to the slit openings 33-36 and 19-22 on the side panels. An alternate method of attaching head straps to the frame is using alligator clips to secure in place as shown in FIG. 15b. (1050)
11. The wearer can also attach a haptic device or motion sensor to the front cover of the viewer housing with Velcro™ strips, micro suction pad, hooks, 3M™ Dual Lock™ reclosable fasteners, magnets, and/or conventional attachment to a slit opening as remote controls to operate the VR software app. (1060)

To disassemble the virtual reality headset into its compact self-contained case for storage as noted in FIGS. 10-13, the sequence is as follows (a flow chart representing the steps is shown as FIG. 31):

1. The collapsible virtual reality headset is in its assembled configuration as shown in FIG. 5.
2. The lens holder assemblies 3 and 4 are removed from the viewer housing 1. (1070)
3. The viewer housing 1 laid flat by folding creases 69-71 inward as shown in FIG. 10. (1080)
4. The lens holder assembly 4 is in flattened disposition by pushing the creases 56 in the same direction as shown in FIG. 11. The lens holder assembly 3 is flattened by the same method.

5. The panels along fold lines 9 and 10 are folded inward so that the lens holder assemblies 3 and 4 placed underneath the panels.
6. Creases 8 and 13 are folded upward and secured locking strip 5 as shown in FIG. 13. An alternate method to secure the case in position with Velcro™ strips as noted in FIG. 27b-28b. (1090)
7. The collapsible virtual reality headset in its compact configuration can be stored in a personal object holder such as a bag or pocket.

The process of construction and use of the present invention in the fourth preferred embodiment as depicted in FIG. 16, is preferably as follows (a flow chart representing the steps is shown as FIG. 31):

1. The fourth preferred embodiment features an alternative collapsible viewer and comprised of viewer housing 80, image separator 85, associated lens holders and support 81, 82, 83 and 84, and a locking strip 86.
2. To assemble the viewer housing 80, creases 96, 101, 108, and 115 are folded inwardly toward each other into a box and secure by sliding flap 87 through slit openings 113 and 114 and flap 122 into openings 97 and 98 as shown in FIG. 17. (1000)
3. Crease 165 of the image separator 85 is folded upward, while crease 167 folded in opposite direction. Image separator 85 is attached to the viewer housing by sliding flap 164 through slit openings 99 and 100 and flap 168 into openings 111 and 112. (1010)
4. The lens holder assemblies 81 and 82, comprising of a pair of biconvex lenses 142 and 145, retain in an upright position with supports 83 and 84 respectively.
5. Crease 133 of the tens holder assembly 81 is folded at a 90 degree with the flat side of lens 142 facing away from edge 139. Crease 154 of the support 83 component is also folded at a 90 degree. To retain the lens holder assembly 81 at an upright position, support 83 is secured in place by inserting its flaps 185 and 186 into slots 137 and 138 respectively, providing additional structural reinforcement. To tailor to the user's pupillary distance and comfort, use creases 134-136 instead of fold line 133 on the lens holder 81 and adjust creases 155-158 instead of fold line 154 on the support 83 to match. The same construction method applies to lens holder assembly 82 with support 84 configuration. (1020)
6. Creases 140a and 140b of support 83 and creases 189a and 189b of support 84 are folded inward in the direction of the upright position of the lens holder 81 and 82 assemblies respectively, forming a track along the edges.
7. The lens holder assemblies 81 and 82 are attached to the viewer housing 80 by Velcro™ strips 169-170 to 177a and 178a and 171-172 to 177b and 178b and secured in position between side wall flaps 93-94 and 106-107. The flat side of lens should be facing the wearer. (1030)
8. Set the VR app on the smart device to play before placing the smart device on top of the micro suction pad 128 as shown in FIG. 17.
9. Creases 110, 123, 124, and 129 are folded upward and secured Velcro™ strips 125 and 127 to 175 and 176 respectively as shown in FIGS. 17 and 20. The side panels along fold lines 123 and 124 block off light from the sides to reduce glare. (1040)
10. The wearer holds the headsets and looks through the lenses to view the stereoscopic images or video on the smart device screen.
11. To assemble the headset for hands-free use as shown in FIGS. 30a and 30b, head straps are inserted to the slit openings 89-92 and 116-119 on the side panels, providing additional structural reinforcement to the frames. An alternate method of attaching head straps to the frame is using alligator clips to secure in place as shown in FIG. 30b. (1050)
12. The wearer can also attach a haptic device or motion sensor to the front cover of the viewer housing with Velcro™ strips, micro suction pad, hooks, 3M™ Dual Lock™ reclosable fasteners, magnets, and/or conventional attachment to a slit opening as remote controls to operate the VR software app. (1060)

To disassemble the virtual reality headset into its compact self-contained case for storage as noted in FIGS. 25-28b, the sequence is as follows (a flow chart representing the steps is shown as FIG. 31):

1. The collapsible virtual reality headset is in its assembled configuration as shown in FIG. 20.
2. The lens holder assemblies 81 and 82 are removed from the viewer housing 80. The supports 83 and 84 are left intact in the lens holder assemblies. (1070)
3. The viewer housing 80 laid flat by folding creases 95, 120, and 173 inward as shown in FIG. 25. (1080)
4. The lens holder assembly 81 and support 83 are placed in flatten disposition by pushing the creases 133 and 154 in the same direction as shown in FIG. 26. The lens holder assembly 82 and support 84 are flattened by the same method.
5. The panels along fold lines 123 and 124 are folded inward so that the lens holder assemblies 81 and 82 placed underneath the panels.
6. Creases 110 and 129 are folded upward and secured with Velcro™ strips 125 and 127 or with locking strip 86 as shown in FIG. 27a-28b. (1090)
7. The collapsible virtual reality headset in its compact configuration can be stored in a personal object holder such as a bag or pocket.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:
1. A virtual reality headset for a user viewing, with eyes of the user, a three-dimensional environment for use with a smart device with a screen comprising:
   a blank panel, wherein said blank panel is configured to be folded along fold lines to form an enclosed viewer housing;

wherein said viewer housing is configured to be assembled into a self-contained case via a slit opening and flap system;
wherein flaps are configured to slide within slit openings of said slit opening and flap system;
wherein each flap has a corresponding slit opening of the slit opening and flap system;
wherein said viewer housing is equipped with side panels;
a pair of biconvex lenses, said pair of biconvex lenses attached to lens holders;
wherein said lens holders are disposed within said viewer housing;
wherein said lens holders are in communication with said side panels of said viewer housing;
wherein the pupillary distance of said pair of biconvex lenses is adjustable between 40-76 mm;
wherein the distance between the pair of biconvex lenses to the image display is user adjustable;
a micro suction pad disposed within said viewer housing;
said micro suction pad configured to hold the smart device fixedly in position inside said viewer housing;
an image separator, said image separator being collapsible and disposed in said viewer housing between said lens holders;
wherein said image separator splits the screen of the smart device such that each eye of the eyes is only shown one-half of the screen; and
straps, wherein said straps are attached to said side panels through slit openings.

2. The collapsible virtual reality headset of claim 1, wherein said blank panel is constructed from at least one of the following materials: paper, cardboard, cardstock, plastic, metal, foam, or aluminum.

3. The collapsible virtual reality headset of claim 1, further comprising a front wall; and
wherein said front wall is equipped with an opening for the camera lens of the smart device.

4. The collapsible virtual reality headset of claim 3, further comprising hook-and-loop fasteners disposed at said slit openings of said slit opening and flap system; and
wherein said hook-and-loop fasteners facilitates user-adjustability of said pair of biconvex lenses.

5. The collapsible virtual reality headset of claim 1, wherein said side panels are opaque.

6. The collapsible virtual reality headset of claim 4, wherein said side panels are opaque.

7. The collapsible virtual reality headset of claim 4,
wherein said pair of biconvex lenses have a first side and a second side;
wherein said first side of said pair of biconvex lenses has a greater curvature than that of a lesser curvature of said second side of said pair of biconvex lenses; and
wherein said pair of biconvex lenses are oriented such that said second side is facing away from the smart device and facing a wearer.

8. The collapsible virtual reality headset of claim 4, wherein said pair of biconvex lenses are aspheric.

9. The collapsible virtual reality headset of claim 7, wherein said pair of biconvex lenses are aspheric.

* * * * *